(12) United States Patent
Lebas et al.

(10) Patent No.: US 6,260,684 B1
(45) Date of Patent: Jul. 17, 2001

(54) CLUTCH MECHANISM FOR FRICTION CLUTCH

(75) Inventors: Gilles Lebas, Asnieres (FR); Ernesto Lanzarini, Moncalieri (IT)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/230,543

(22) PCT Filed: May 28, 1998

(86) PCT No.: PCT/FR98/01065

§ 371 Date: Nov. 22, 1999

§ 102(e) Date: Nov. 22, 1999

(87) PCT Pub. No.: WO98/54477

PCT Pub. Date: Dec. 3, 1998

(30) Foreign Application Priority Data

May 30, 1997 (FR) .................................................. 97 06654

(51) Int. Cl.[7] ...................................................... F16D 13/50
(52) U.S. Cl. .................................... 192/70.27; 192/109 A
(58) Field of Search ............................ 192/70.27, 89.23, 192/109 A

(56) References Cited

U.S. PATENT DOCUMENTS

| | | | |
|---|---|---|---|
| 5,088,584 | | 2/1992 | Inaba et al. . |
| 5,632,365 | * | 5/1997 | Maucher ........................ 192/109 A X |
| 5,715,920 | * | 2/1998 | Lindner et al. ................ 192/89.23 X |
| 5,715,921 | * | 2/1998 | Link et al. ..................... 192/89.23 X |
| 5,758,756 | * | 6/1998 | Weiss et al. ................... 192/70.27 X |
| 5,862,901 | * | 1/1999 | Weiss et al. ................... 192/70.27 X |
| 6,016,897 | * | 1/2000 | Bacher ............................. 192/70.27 |

FOREIGN PATENT DOCUMENTS

| | | |
|---|---|---|
| 2120320 | 11/1983 | (GB) . |
| 2296541 | 7/1996 | (GB) . |

* cited by examiner

*Primary Examiner*—Rodney H. Bonck
(74) *Attorney, Agent, or Firm*—Liniak, Berenato, Longacre & White

(57) ABSTRACT

The invention concerns a clutch mechanism for friction clutch, in particular for motor vehicles, comprising a cover (8) with a transversely oriented base (80) and means (81) for fixing the clutch mechanism on a rotating flywheel (1), a pressure plate (3), elastic tabs linking in rotation, with axial mobility, the pressure plate (3) in rotation with the cover (8), axially operating elastic clutching means (7) axially stressing the pressure plate (8) in the opposite direction from the cover (8) base (80) and a disengaging device countering at will the action of said elastic clutching means (7): said elastic clutching means (7) are associated with two elastic washers (4, 6) mounted between the pressure plate (3) and the cover (8), and adapted to act on the pressure plate (3) parallel relative to the elastic clutching means (7) in a direction disengaging the clutch.

8 Claims, 1 Drawing Sheet

Fig. 1
Fig. 2
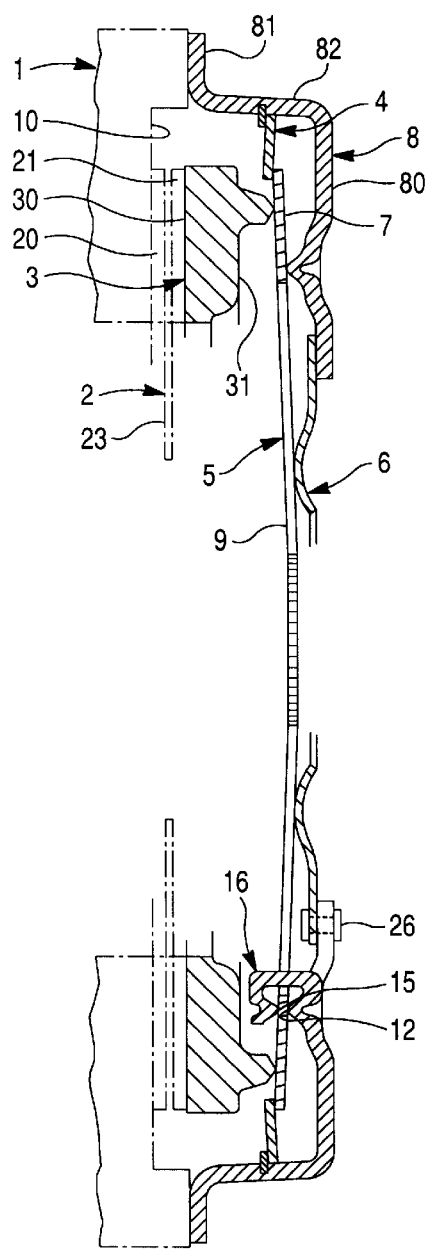
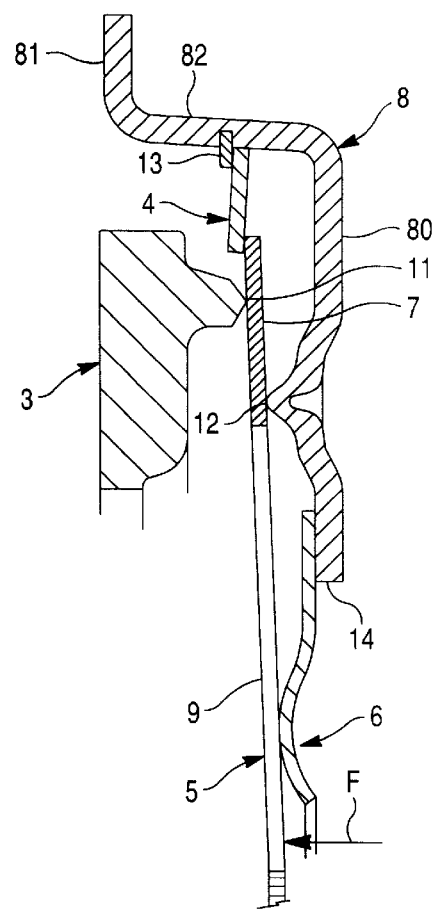
Fig. 3
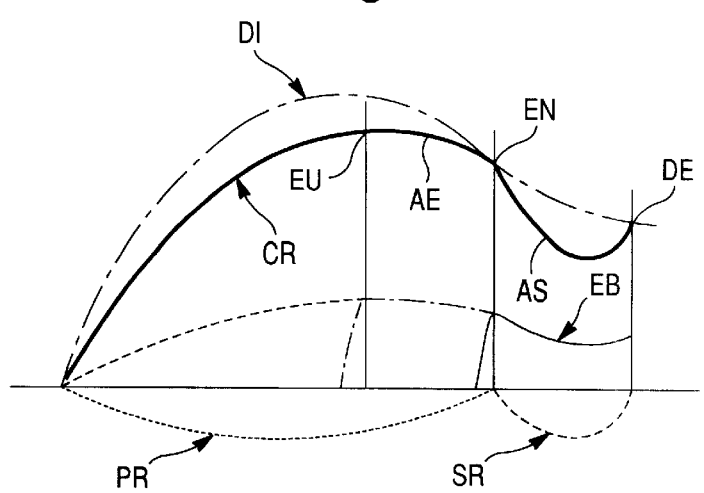

CLUTCH MECHANISM FOR FRICTION CLUTCH

The present invention concerns friction clutches, in particular for motor vehicles, and more particularly the clutch mechanism of a clutch of this kind.

In a conventional clutch disposed between a driving shaft and a driven shaft a diaphragm bears against the back of a cover fixed to a rotational drive flywheel to move a pressure plate towards said flywheel, forming a reaction plate, to clamp the friction linings of a clutch friction disc between said pressure and reaction plates.

The drive flywheel is constrained to rotate with a first shaft, for example a driving shaft, and the clutch friction disc has at its inside periphery a hub by which it is constrained to rotate with a second shaft, for example a driven shaft.

The clutch is normally engaged to transmit torque between the driving and driven shafts.

To disengage the clutch in the case of a push type clutch a clutch release thrust bearing presses axially on the inside ends of fingers of the diaphragm to cause said diaphragm to pivot and to eliminate the force that the diaphragm applies to the axially mobile pressure plate in order to release the friction linings. Torque is then no longer transmitted from the driving shaft to the driven shaft because the friction linings are no longer clamped between the pressure and reaction plates constrained to rotate with the hollow cover.

The cover, the pressure plate and the diaphragm usually form a unitary assembly known as the clutch mechanism that is attached by its cover to the flywheel, elastic tongues which allow axial mobility coupling the pressure plate rotationally to the cover.

The diaphragm has a hole in the centre and an outside peripheral part in the form of a Belleville washer extended inwardly by a central part divided into radial fingers by slots. The Belleville washer part of the diaphragm bears on the cover and on the pressure plate. Accordingly, the clutch release device of the clutch, which selectively opposes the action of the clutch engaging spring means, consists of the fingers of the diaphragm on whose inside end the clutch release thrust bearing operates, whereas the Belleville washer of the diaphragm constitutes axially acting clutch engaging spring means for clamping the friction linings between the pressure and reaction plates and therefore urging the pressure plate axially away from the back of the cover.

When unstressed, the diaphragm is frustoconical in shape. When fitted into the clutch its Belleville washer is pre-stressed and is flattened to a greater or lesser degree. The cone angle of the Belleville washer is modified on disengaging the clutch.

The characteristic curve of the diaphragm, which represents the force exerted as a function of the clutch release travel, for example at the inside end of the diaphragm fingers, is determined by the dimensions of its Belleville washer, in particular by the ratio of the height of the frustoconical Belleville washer when unstressed to the thickness of the diaphragm.

The characteristic curve has a maximum.

Accordingly, the force to be applied to the inside end of the diaphragm fingers during release of the clutch increases to a maximum, decreases gradually to a minimum and then increases again.

There can be a considerable difference between the maximum force and the minimum force. For more information on the characteristic curve reference may be had to document FR-A-1 392 569, for example.

Document FR-A-1 392 569 describes a progressive action spring device external to the clutch friction disc to eliminate the aforementioned maximum during the clutch release travel. The device is mounted in series with the Belleville washer of the diaphragm and produces a spring force significantly less than that of the Belleville washer. The device has a limited travel between a pre-stressed position in which its force is maximum and a stressed position in which its force is minimum.

This achieves an increasing clutch release force at the clutch release thrust bearing.

Assistance of the required magnitude may not be obtained over the clutch release travel, the progressively acting device reducing the force applied by the diaphragm to the pressure plate during clutch release.

The load curves of the progressively acting device, usually mounted within the clutch friction disc between the friction linings thereof and the diaphragm, have shapes that prevent them being combined to obtain a high level of clutch release assistance, in particular if the clutch release travel and force are to be compatible with existing clutch release devices. What is more, the shape of the curve of the progressive action device changes very quickly through the service life of the clutch, which eliminates clutch release assistance in direct proportion to the required level of assistance. To prevent ageing of the assistance device curve it is preferable to locate the device where its stiffness curve will remain stable in time and in particular at a location outside the progressive action area where lining contact and indentation change and cause the progressive action curve to change.

Consideration could be given to using an assistance spring in parallel with the diaphragm. In this case the assistance spring, for example in the form of a Belleville washer, could bear on the cover and on the inside end of the diaphragm fingers.

In the clutch engaged position it could then apply a minimum force and thereafter, its cone angle varying, a force to assist release of the clutch. The assistance force must therefore be minimum in the clutch engaged position throughout the service life of the clutch.

The ideal for this type of implementation is to use a device for compensating wear, in particular wear of the friction linings, referred to hereinafter as the wear compensator device, which holds the diaphragm in substantially the same position all the time, regardless of wear of the friction linings of the disc and/or of the friction faces of the pressure and reaction plates, so that under all circumstances and throughout the service life of the clutch the assistance spring applies a very low force when the clutch is in the engaged position.

The aim of the present invention is to obtain a similar result without using any wear compensator device.

Accordingly a clutch mechanism in accordance with the invention for friction clutches, in particular for motor vehicles, including a cover with a transversely oriented back and fixing means for fixing the clutch mechanism to a rotational drive flywheel, a pressure plate having a friction face at the front for co-operation with a clutch friction disc, spring tongues for rotationally coupling the pressure plate with the cover, with axial mobility, and, disposed between the dorsal face of the pressure plate and the back of the cover, on the one hand, axially acting clutch engaging spring means urging the pressure plate axially away from the back of the cover and, on the other hand, a clutch release device for selectively opposing the action of said clutch engaging spring means, is characterised in that said clutch engaging spring means are associated with two spring washers mounted between the pressure plate and the cover, said washers being adapted to operate on the pressure plate in parallel with the clutch engaging spring means and in the clutch release direction.

The spring characteristics of the first washer are advantageously chosen so that when the clutch is engaged and the clutch friction disc is new the action exerted on the pressure plate by the first washer is very low or even zero.

The spring characteristics of the first washer are preferably chosen so that the action exerted on the pressure plate by the first washer during clutch release is very low or even zero.

The spring characteristics of the first washer are advantageously chosen so that when the clutch is engaged and the clutch friction disc is worn the action exerted on the pressure plate by the first washer in the clutch release direction increases continuously.

The spring characteristics of the second washer are preferably chosen so that when the clutch is engaged and the clutch friction disc is new the action exerted on the pressure plate by the second washer is very low or even zero.

The spring characteristics of the second washer are advantageously chosen so that during release of the clutch the force exerted on the pressure plate by the second washer in the clutch release direction increases and then decreases to a very low or even zero value when the clutch is released.

The spring characteristics of the second washer are preferably chosen so that when the clutch is engaged and the clutch friction disc is worn the action exerted by the second washer is very low or even zero.

The clutch engaging spring means advantageously consist in the outside peripheral part of a diaphragm extended inwardly by a central part subdivided into radial fingers by slots constituting the clutch release means.

The mechanism is preferably of the push type.

The outside periphery of the first washer preferably bears on the cover and its inside periphery preferably bears on the outside edge of the peripheral part of the diaphragm on the side of that edge facing the pressure plate.

The force transmitting means are advantageously disposed between the inside periphery of the first washer and the outside edge of the peripheral part of the diaphragm.

The outside periphery of the second washer preferably bears on the cover and the second washer is preferably adapted to co-operate with the fingers of the diaphragm.

The following description illustrates the invention with reference to the accompanying drawings, in which:

FIG. 1 is a view in axial section of a clutch in accordance with the invention in the engaged position;

FIG. 2 is a half-view in axial section of the clutch mechanism from FIG. 1, to a larger scale;

FIG. 3 shows curves representative of the force applied to the pressure plate of the clutch in accordance with the invention by the elastic components as a function of the degree to which they are crushed.

The clutch shown in FIG. 1 includes an assembly of annular components, namely in axial succession a rotational drive flywheel 1 for fixing the clutch to a first shaft, for example a driving shaft, a clutch friction disc 2 having at its outside periphery friction linings 20, 21 and at its inside periphery a hub (not shown) for rotationally coupling the clutch to a second shaft, for example a driven shaft, a pressure plate 3, a first spring washer 4, a diaphragm 5, a second spring washer 6, a cover 8 which here is hollow with a globally transverse back 80 having a hole at the centre and, at its outside periphery, fixing means 81 for fixing the cover 8 to the flywheel 1 forming the pressure plate.

The flywheel 1 has a friction face 10 on the back and only part of it is shown here, having central holes for fixing it to the driving shaft by means of screws, in a manner known in itself. Here the flywheel 1 is cast in one piece with the pressure plate 3 which has a friction face 30 on the front facing the friction face 10 of the flywheel 1.

Here the flywheel 1 and the pressure plate 3 are made of cast iron.

The clutch friction disc 2 also includes a support disc 23 carrying the friction linings 20, 21, which may be subdivided. The linings 20, 21 are on respective opposite sides of the support disc 23 to which they are fixed by riveting, for example. Here, the linings 20, 21 are glued or brazed to the metal support disc 23.

Progressive axially acting spring means are disposed between the two linings 20, 21 in a manner known in itself for progressive clamping thereof between the flywheel 1 and the pressure plate 3. These means can be of any appropriate kind. As shown here they are obtained by conforming the support disc 23 appropriately. By way of non-limiting example the disc can have a central part for coupling it, elastically or otherwise, to the hub and a peripheral part subdivided into radial blades, for example of the tripod type. Each blade then has a central bearing area for fixing one of the friction linings 20, 21 and two outside peripheral bearing areas adapted to co-operate with the other friction lining 20, 21.

The bearing areas are offset axially relative to the central part of the disc 23, the relatively large central bearing area being joined to said central part by a tangential bend while the peripheral bearing areas are joined to said central bearing area by oblique bends. For more information reference should be had to document U.S. Pat. No. 5,452,783 which also discloses an implementation with friction linings subdivided into pads.

As mentioned hereinabove, the disc 23 can be elastically coupled to the hub. Alternatively, the disc 23 is rigidly coupled to the hub, in which case the flywheel 1 is subdivided into two masses elastically coupled together by circumferential or radial action springs.

As an alternative to this, the flywheel 1 can be in two parts and include a support flange fixed at its inside periphery to the driving shaft and at its outside periphery to a reaction plate providing the friction face 10. In this case the cover 8 can be assembled to the flywheel 1 in two parts by means of axially oriented lugs on its cylindrical peripheral skirt 82. These tenon-shape lugs are then engaged in mortices formed on the outside periphery of the reaction plate or the support flange. The free section of the lugs, forming the aforementioned fixing means 81 of the cover 8, can be crimped or welded to the flange or to the reaction plate, as described for example in French Patent Application 95 12523 filed Oct. 24, 1995.

Here the cover 8 is of conventional shape and the fixing means 81 comprise a radial rim on the cover 8, directed radially away from the axial axis of symmetry of the clutch, said rim 81 having holes (not shown) in it for fitting members for fixing the rim 81 to the flywheel 1, such as screws or rivets.

In a motor vehicle application, the driving shaft is the engine output shaft of the vehicle to the crankshaft of which the flywheel 1 is fixed and the driven shaft is the input shaft of the gearbox.

It is of course possible to interchange the above structures, the first shaft being a driven shaft and the second shaft a driving shaft.

In this figure the pressure plate 3 is coupled rotationally to the cover 8 by elastic tongues enabling the pressure plate 3 to move axially relative to the cover 8. The pressure plate 3 is therefore constrained to rotate with the cover 8 and the flywheel 1 but mobile axially relative to them.

Here the tongues are tangentially oriented and urge the pressure plate 3 towards the back 80 of the cover. The elastic tongues are therefore axially acting tongues and have a return action. As an alternative to this the tongues can be radially oriented.

The diaphragm 5 has an outside peripheral part 7 extended inwardly by a central part subdivided into radial fingers 9.

The diaphragm 5 is mounted between the pressure plate 3 and the cover 8. Its peripheral part 7, in the vicinity of its outside part, bears on a support which is usually subdivided and which is on the pressure plate 3 facing the back 80 of the cover 8 and, in the vicinity of the inside part of its peripheral part 7, on a pressed portion 12 of the back 80 of the cover 8 which is optionally subdivided and directed axially towards the pressure plate 3.

The pressed portion 12 forms a primary support for the diaphragm 5. In a manner that is known in itself the diaphragm 5 is articulated to the cover 8 which has, in addition to the main support 12, a secondary support 15 here consisting of a pressed portion at the end of lugs 16 obtained by cutting and bending to shape the inside border of the back 80 of the cover 8.

Here the clutch is a push type clutch.

The fingers 9 of the diaphragm 5 selectively oppose and overcome the spring action of its peripheral part 7 in the form of a Belleville washer in order selectively to release the friction linings 20, 21 and the clutch friction disc 2 from between the pressure plate 3 and the reaction plate 1 in order to disengage the clutch.

The peripheral part 7 of the diaphragm 5 clamps said linings 20, 21 between the plates 1 and 3 and constitutes axially acting clutch engaging means urging the pressure plate away from the back 80 of the cover 8.

The fingers 9 of the diaphragm 5 can move in the direction of the arrow F to release the clutch, which is of the push type.

The outside periphery of the first spring washer 4 bears on the cover 8, here through the intermediary of an abutment 13 carried by the cylindrical skirt 82 of the cover 8, on the side of the abutment 13 facing the back 80 of the cover 8, and its inside periphery bears on the outside edge of the peripheral part 7 of the diaphragm 5, on the side of that outside edge facing the pressure plate 3. To prevent wear the edge of the peripheral part 7 of the diaphragm 6 that is in contact with the first elastic washer 4 is advantageously rounded; alternatively, the peripheral part 7 and the first spring washer 4 are locally recessed to receive a force transmission ring; alternatively the inside periphery of the first spring washer 4 carries a rounded pressed portion directed towards the back 80 of the cover 8 and through which it bears on the peripheral part 7 of the diaphragm 5.

The outside periphery of the second spring washer 6 bears on the cover 8, to be more precise on the back 80 of the cover in an area near its central opening, radially below the stamped portion 12; the outside periphery of the second spring washer 6 is attached to the cover, here by rivets 26 which here are axially between the back 80 of the cover 8 and the diaphragm 5, the second spring washer 6 co-operating with the fingers 9 of the diaphragm in an area near the end thereof.

Accordingly, the clutch here being of the push type, the first washer 4 and the second washer 6 are adapted, bearing on the cover 8, to operate on the diaphragm in the clutch release direction by pivoting of the diaphragm about the stamped portions 12 of the cover 8 on which it bears, in the clockwise direction in FIGS. 1 and 2.

The first spring washer 4 provides a clutch clamping force that increases less with clutch wear and the second washer 6 provides assistance on releasing the clutch.

To be more precise, FIG. 3 shows curves representative of the force applied to the pressure plate 3 by the elastic components of the clutch as a function of their travel, i.e. the degree to which they are crushed. The curve DI corresponds to the diaphragm 5, to be more precise its peripheral part 7: when the clutch is engaged and the linings are new the clamping force corresponds to point EN on this curve; as the linings wear, and as known in itself, the position of the diaphragm varies and the clamping force increases, the representative point moving towards the left from the point EN on the curve DI; when the clutch is released at the end of the travel of the clutch release means, the force to be overcome is that shown at DE.

The spring characteristics of the first washer 4 are chosen so that the first washer is not operative during releasing of the clutch and does not apply any force, or very little force, in the clutch engaged position with new linings; what is more, the action of the first washer 4 on the pressure plate 3 in the clutch release direction increases continuously; the curve PR represents the characteristics of this washer.

Accordingly, as wear proceeds, the clamping force varies along the curve AE which in this area combines the curves DI and PR; with maximum wear the force represented by EU is lower than that corresponding to the diaphragm alone; because of the first washer 4, the clamping force then increases less as wear proceeds without affecting the force EN corresponding to the situation of new linings.

The spring characteristics of the second washer 6 are chosen so that it is operative in the clutch release phase only from the position corresponding to the clutch engaged condition, with new linings, where it has no or very little action (point EN in FIG. 3); likewise at point DE; the curve SR represents the characteristics of the second washer 6.

Accordingly, during release of the clutch, the force varies along the curve AS which combines the curves DI and SR in the corresponding areas; this force is less than that due to the diaphragm alone, the second washer 6 being a clutch release assistance washer.

FIG. 3 shows the curves for the force at the clutch release ring that allow for the lever arms and the kinematics involved in releasing the clutch; the curve EBN corresponds to the necessary effort when the linings are new and the curve EBU corresponds to this effort when the linings are worn. Clearly, by virtue of the invention, this force is low and fluctuates little as wear proceeds.

Clearly to implement a clutch of the pull type, i.e. in which the clutch is released by operating on the diaphragm 5 in the opposite direction to that of the arrow F, it is sufficient to place the bearing points of the washers 4 and 6 on the diaphragm 5 in accordance with the point of articulation of the diaphragm 5 relative to the cover 8 so that, once again, the two washers 4 and 6 operate in the clutch release direction: in this variant (not shown) the first washer 4 and the second washer 6 both are operative on the same side of the diaphragm 5 relative to its point of articulation which, as is known in itself, is at the outside periphery of the diaphragm.

Of course, secondary support for the diaphragm can be provided by columns passing through the diaphragm and having a profiled head.

It is also necessary to take account of the previously mentioned progressive action spring means, the effects of which are added to those of the second washer 6 in the clutch release phase. This forms assistance means. The return force of the elastic tongues must also be allowed for.

In one variant the cover 8 can be flat in shape. The reaction plate 1 then has an axially oriented annular skirt at its outside periphery which is longer than that shown in FIG. 1. In this case the thrust bearing 13 is carried by the skirt of the reaction plate 1.

What is claimed is:

1. Clutch mechanism for friction clutches, including a cover (8) with a transversely oriented back (80) and fixing means (81) for fixing the clutch mechanism to a rotational drive flywheel (1), a pressure plate (3) having a friction face (30) at the front for co-operation with a clutch friction disc (2), spring tongues for rotationally coupling the pressure plate (3) with the cover (8), with axial mobility, and, disposed between the dorsal face (31) of the pressure plate (3) and the back (80) of the cover (8), on the one hand, axially acting clutch engaging spring means (7) urging the pressure plate (8) axially away from the back (80) of the cover (8) and, on the other hand, a clutch release device (9) for selectively opposing the action of said clutch engaging spring means (7), in which said clutch engaging spring means (7) are associated with two spring washers (4, 6) mounted between the pressure plate (3) and the cover (8), said washer (4, 6) being adapted to operate on the pressure plate in parallel with the clutch engagement spring means (7) and in the clutch release direction, and in which the spring characteristics of the first washer (4) and the second washer (6) are chosen so that when the clutch is engaged and the clutch friction disc (2) is new the action exerted on the pressure plate (3) by the first washer (4) and the second washer (6) are very low or even zero, characterised in that the spring characteristics of the first washer (4) are chosen so that the action exerted on the pressure plate (3) by the first washer (4) during clutch release is very low or even zero and in that the spring characteristics of the second washer (6) are chosen so that during release of the clutch the force exerted on the pressure plate (3) by the second washer (6) in the clutch release direction increases and then decreases to a very low or even zero value when the clutch is released.

2. Mechanism according to claim 1 characterised in that the spring characteristics of the first washer (4) are chosen so that when the clutch is engaged and the clutch friction disc (2) is worn the action exerted on the pressure plate (3) by the first washer (4) in the clutch release direction increases continuously.

3. Mechanism according to claim 1 or 2 characterised in that the spring characteristics of the second washer (6) are chosen so that when the clutch is engaged and the clutch friction disc (2) is worn the action exerted by the second washer (6) is very low or even zero.

4. Mechanism according to claim 3 characterised in that the clutch engaging spring means (7) consist in the outside peripheral part of a diaphragm (5) extended inwardly by a central part subdivided into radial fingers (9) by slots constituting the clutch release means.

5. Mechanism according to claim 4 characterised in that the mechanism is of the push type.

6. Mechanism according to claim 5 characterised in that the outside periphery of the first washer (4) bears on the cover (8) and its inside periphery bears on the outside edge of the peripheral part (7) of the diaphragm (5) on the side of that edge facing the pressure plate (3).

7. Mechanism according to claim 6 characterised in that a force transmitting means are disposed between the inside periphery of the first washer (4) and the outside edge of the peripheral part (7) of the diaphragm (5).

8. Mechanism according to claim 5 characterised in that the outside periphery of the second washer (6) bears on the cover (8) and the second washer (6) is adapted to co-operate with the fingers (9) of the diaphragm (5).

* * * * *